(12) United States Patent
Liu

(10) Patent No.: US 10,016,640 B2
(45) Date of Patent: Jul. 10, 2018

(54) NON-METALLIC ANTI-EXPLOSION BALL

(71) Applicant: Jiangsu Core Safety Propulsion Co., Ltd., Jiangsu (CN)

(72) Inventor: Shun Liu, Jiangsu (CN)

(73) Assignee: Jiangsu Core Safety Propulsion Co., Ltd., Jiangsu (CN)

( * ) Notice: Subject to any disclaimer, the term of this patent is extended or adjusted under 35 U.S.C. 154(b) by 0 days.

(21) Appl. No.: 15/327,461

(22) PCT Filed: May 26, 2015

(86) PCT No.: PCT/CN2015/079762
§ 371 (c)(1),
(2) Date: Jan. 19, 2017

(87) PCT Pub. No.: WO2016/029722
PCT Pub. Date: Mar. 3, 2016

(65) Prior Publication Data
US 2017/0165512 A1    Jun. 15, 2017

(30) Foreign Application Priority Data

Aug. 25, 2014  (CN) .......................... 2014 1 0421570

(51) Int. Cl.
*A62C 3/06*      (2006.01)
*F17C 13/12*     (2006.01)

(52) U.S. Cl.
CPC ................ *A62C 3/06* (2013.01); *F17C 13/12* (2013.01)

(58) Field of Classification Search
CPC .................................. A62C 3/06; F17C 13/12
See application file for complete search history.

(56) References Cited

U.S. PATENT DOCUMENTS 6,062,417 A    5/2000   Evans

FOREIGN PATENT DOCUMENTS

CA         2455020 A1    7/2004
CN       203123391 U     8/2003
(Continued)

OTHER PUBLICATIONS

International Search Report for PCT/CN2015/079762 dated Aug. 28, 2015. 6 pages.

*Primary Examiner* — Michael C Miggins
(74) *Attorney, Agent, or Firm* — Fish & Richardson P.C.

(57) ABSTRACT

Disclosed is a non-metallic anti-explosion ball, comprising an equatorial ring (1), longitudinal sheets (2), a south-polar ring (41) and a north-polar ring (31). The equatorial ring (1) and the longitudinal sheets (2) are arranged perpendicularly. The south-polar ring (41) and the north-polar ring (31) are located on two sides of the equatorial ring (1) respectively. The south-polar ring (41) is located at one end of the longitudinal sheets (2), and the north-polar ring (31) is located at the other end of the longitudinal sheets (2). The equatorial ring (1), the south-polar ring (41) and the north-polar ring (31) are coaxial. A projection of the south-polar ring (41) is located inside a projection of the equatorial ring (1) in an axial direction of the equatorial ring (1), and a projection of the north-polar ring (31) is positioned inside the projection of the south-polar ring (41). Projections of the longitudinal sheets (2) extend from the projection of the north-polar ring (31) to the equatorial ring (1). A manufacturing process for the non-metallic anti-explosion ball is simple, and the production efficiency is high.

10 Claims, 3 Drawing Sheets

(56) References Cited

FOREIGN PATENT DOCUMENTS

| CN | 102614604 A | 8/2012 |
|----|-------------|--------|
| CN | 202376651 U | 8/2012 |
| CN | 102795434 A | 11/2012 |
| CN | 102807054 A | 12/2012 |
| CN | 102921124 A | 2/2013 |

NON-METALLIC ANTI-EXPLOSION BALL

FIELD OF THE INVENTION

The present invention relates to a non-metallic anti-explosion ball.

BACKGROUND OF THE INVENTION

In recent years, with the development of the national economy, inflammable and explosive liquids/gases, such as gasoline, liquefied petroleum gas, propane, and so on, are more and more widely used in daily production and life. Typically, the inflammable and explosive liquids/gases are stored in fuel tanks.

A fuel tank, which is a container for receiving oil, refers in particular to a device for the storage of fuel oil on a machine driven by a diesel engine or a gasoline engine.

Generally, space above a liquid level in a fuel tank is filled with mixed combustible gases. When there is an ignition source, the ignition source will ignite adjacent mixed gases. The combustion of the mixed gases will spread rapidly if not restricted. Because of the ignition and flame propagation, an increasing pressure wave will be generated in front of the flame front, the pressure wave will strongly compress unburned mixed gases and lead to an explosion of the tank, the whole process may happen in only a few milliseconds.

Therefore, in production, transportation, storage and use processes, burning and explosion accidents often happen due to improper security measures or accidents, and significant property damages and casualties are often caused. Therefore, the suppression of fires and explosions of hazardous chemicals is attracting more and more attention.

In recent years, the emergence of various anti-explosion materials effectively solves the security issues of flammable and explosive liquids/gases in production and storage processes, wherein alloy mesh anti-explosion material is particularly widely used.

The alloy mesh anti-explosion material has the characteristics of good thermal conductivity, strong electrical conductivity, large specific surface area, and so on. After being fully distributed in the fuel tank, it can effectively curb the propagation of the flame and attenuate the explosive pressure wave rapidly. Meanwhile, this kind of alloy mesh anti-explosion material has high surface efficiency in unit volume, so that it has good heat absorption; it can absorb the heat released from combustion rapidly, reduce the temperature after combustion reaction, and decrease the expansive degree of the reaction gases. The increase of pressure within the container is limited and the burning rate cannot reach the speed limit of explosion, so that the purpose of explosion proof is achieved.

However, the main component of the alloy mesh anti-explosion material is metals such as aluminum and magnesium, although they have a certain degree of corrosion resistance, there exists the problems of oxidation and aging. Once aged, the material will become brittle and form debris, the debris will fall when being subjected to vibrations and then cause oil pollution or blockage of an oil pipeline. Therefore, the alloy mesh anti-explosion materials need to be replaced regularly, which increases the cost and labor.

In order to overcome the above-mentioned problems, non-metallic balls are used as anti-explosion materials in the prior art. However, various non-metallic anti-explosion balls in the prior art usually have complicated manufacturing processes and low efficiencies.

SUMMARY OF THE INVENTION

A technical problem to be solved by the present invention is to provide a non-metallic anti-explosion ball, which aims at the problem that the non-metallic anti-explosion balls in the prior art usually have complicated manufacturing processes and low efficiencies.

In order to solve the above technical problem, the present invention adopts the following technical solutions.

A non-metallic anti-explosion ball is provided, wherein the non-metallic anti-explosion ball comprises an equatorial ring, at least one longitudinal sheet, a south-polar ring and a north-polar ring; the equatorial ring is arranged to be perpendicular to the longitudinal sheet; the south-polar ring and the north-polar ring are located on two sides of the equatorial ring respectively; the south-polar ring is located at one end of the longitudinal sheet, and the north-polar ring is located at the other end of the longitudinal sheet; the equatorial ring, the south-polar ring and the north-polar ring are coaxial; in an axial direction of the equatorial ring, a projection of the south-polar ring is located inside a projection of the equatorial ring; a projection of the north-polar ring is positioned inside the projection of the south-polar ring; a projection of the longitudinal sheet extends from the projection of the north-polar ring to the equatorial ring; the material of the non-metallic anti-explosion ball comprises a substrate, carbon fibers, optional carbon black, optional carbon nanotubes, and an antioxidant; the substrate is at least one of the group consisting of nylon 6, nylon 66, polyphenylene sulfide, poly ethylene and polypropylene; the carbon fibers are chopped carbon fibers; the carbon black is nano conductive carbon black; the antioxidant is a combination of a multi-hindered phenolic antioxidant and a phosphite antioxidant; based on the content of the substrate, the content of the carbon fibers is 9-43 wt %, the content of the carbon black is 0-19.6 wt %, the content of the carbon nanotube is 0-19.6 wt %, and the content of the antioxidant is 0.5-0.8 wt %.

The non-metallic anti-explosion ball provided by the present invention can be molded in one time by opening the mould along the axial direction of the equatorial ring, the manufacturing process is simple and the efficiency is high. Meanwhile, the non-metallic anti-explosion ball is light weighted and has a low volume occupying ratio.

Further, the non-metallic anti-explosion ball comprises a plurality of longitudinal sheets, and the plurality of longitudinal sheets intersect at an axis of the equatorial ring.

Further, a supporting piece is fixed on an inner wall of the north-polar ring.

Further, the supporting piece is in a "+" shape, and a plane where the supporting piece is located is perpendicular to the axis of the equatorial ring.

Further, the non-metallic anti-explosion ball comprising a first reinforcement piece, the first reinforcement piece is disposed on a longitudinal sheet between the north-polar ring and the equatorial ring; and in an axial direction of the equatorial ring, a projection of the first reinforcement piece is located between the projection of the south-polar ring and the projection of the equatorial ring. Further, the first reinforcement piece is shaped as a closed loop; and the first reinforcement piece is parallel to the axis of the equatorial ring.

Further, the non-metallic anti-explosion ball comprising a second reinforcement piece, the second reinforcement piece is disposed on a longitudinal sheet between the south-polar ring and the equatorial ring; and in an axial direction of the equatorial ring, a projection of the second reinforcement piece is located between the projection of the south-polar ring and the projection of the first reinforcement piece.

Further, the second reinforcement piece is shaped as a closed loop; and the second reinforcement piece is parallel to the axis of the equatorial ring.

Further, a connecting piece is arranged between the second reinforcement piece and an outer wall of the south-polar ring, and a plane where the connecting piece is located is perpendicular to the axis of the equatorial ring.

Further, the non-metallic anti-explosion ball comprising a third reinforcement piece, the third reinforcement piece is disposed on the equatorial ring along an axial direction of the equatorial ring, one end of the third reinforcement piece is connected to the first reinforcement piece, and the other end of the third reinforcement piece is connected to the second reinforcement piece; in the axial direction of the equatorial ring, a projection of the third reinforcement piece extends from the second reinforcement piece to the equatorial ring; a plane where the third reinforcement piece is located bisects an included angle formed by two longitudinal sheets adjacent to the third reinforcement piece.

When the non-metallic anti-explosion ball with the above-mentioned structure is used in an oil tank, on the premise of ensuring the compression strength, the weight is lighter, and the volume occupying ratio is lower and can reach 5% or less.

Further, the weight ratio of the multi-hindered phenolic antioxidant to the phosphite antioxidant is 1.5-2:1.

Figure 1:
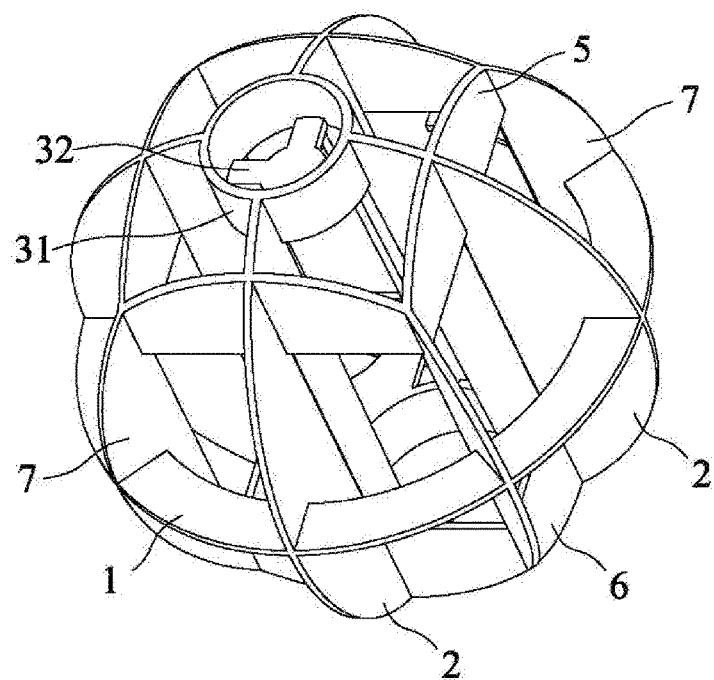
FIG. 1 is a top perspective view of a non-metallic anti-explosion ball provided by a preferred embodiment of the present invention.

The reference signs in the drawings are as follows:
1: equatorial ring; 2: longitudinal sheet; 31: north-polar ring; 32: supporting piece; 41: south-polar ring; 42: connecting piece; 5: first reinforcement piece; 6: second reinforcement piece; 7: third reinforcement piece.

DETAILED DESCRIPTION OF THE PREFERRED EMBODIMENT

In order to make the purposes, technical solutions, and advantages of the present invention more clear, the present invention will be further described in detail hereinafter with reference to the drawings and preferred embodiments. It should be understood that the specific embodiments described here are only intended to illustrate the present invention, but not to limit the present invention.

In the description of the present invention, the relevant terms are defined as follows:

"Equatorial" is defined as: a circle formed by the intersection of a plane passing through a sphere center along the horizontal direction and the sphere.

"Longitudinal" is defined as: the circle formed by the intersection of a plane passing through the sphere center along the vertical direction and the sphere.

"North-polar" is defined as: the top of the sphere.

"South-polar" is defined as: the bottom of the sphere.

It is to be understood that the aforesaid terms for indicating orientations or location relations, such as "longitudinal", "latitudinal", "south-polar", "north-polar", "up", "down", "vertical", "horizontal", "top", "bottom", "inner", "outer" and the like, are merely used to facilitate the description of the present invention and simplify the description, but not to indicate or imply that a device or component must be of a particular orientation or constructed and operated in a particular orientation; therefore, they should not be construed as limiting the invention. In the description of the present invention, "multiple" means two or more unless otherwise specified.

In the description of the present invention, it should be noted that the terms "disposed" and "connected" should be understood broadly, unless the context clearly dictates otherwise; for example, it can be a fixed connection, a detachable connection or an integral connection; it can be a direct connection, and can also be an indirect connection through an intermediary. For those of ordinary skill in the art, the specific meaning of the above terms in the present invention may be understood according to specific conditions.

A non-metallic anti-explosion ball is provided by the present invention, wherein the non-metallic anti-explosion ball comprises an equatorial ring, at least one longitudinal sheet, a south-polar ring and a north-polar ring; the equatorial ring is arranged to be perpendicular to the longitudinal sheet; the south-polar ring and the north-polar ring are located on two sides of the equatorial ring respectively; the south-polar ring is located at one end of the longitudinal sheet, and the north-polar ring is located at the other end of the longitudinal sheet; the equatorial ring, the south-polar ring and the north-polar ring are coaxial; in an axial direction of the equatorial ring, a projection of the south-polar ring is located inside a projection of the equatorial ring; a projection of the north-polar ring is positioned inside the projection of the south-polar ring; projections of the longitudinal sheet extend from the projection of the north-polar ring to the equatorial ring; the material of the non-metallic anti-explosion ball comprises a substrate, carbon fibers, optional carbon black, optional carbon nanotubes and an antioxidant; the substrate is at least one of the group consisting of nylon 6, nylon 66, polyphenylene sulfide, poly ethylene and polypropylene; the carbon fiber are chopped carbon fibers; the carbon black is nano conductive carbon black; the antioxidant is a combination of a multi-hindered phenolic antioxidant and a phosphite antioxidant; based on the content of the substrate, the content of the carbon fibers is 9-43 wt %, the content of the carbon black is 0-19.6 wt %, the content of the carbon nanotube is 0-19.6 wt % and the content of the antioxidant is 0.5-0.8 wt %.

In order to avoid the accumulation of oil at the intersection between sheets, various non-metallic anti-explosion balls of the prior art are generally opened or hollowed at the corners formed between their sheets. However, the manufacturing of a non-metallic anti-explosion ball with such a structure is very difficult, a mould thereof should be opened from multiple directions. This results in that the manufacturing process of the non-metallic anti-explosion ball is complex, and of low efficiency. The non-metallic explosion proof ball provided by the present invention can be molded in one time by opening the mould along the axial direction of the equatorial ring, the manufacturing process is simple, and the production efficiency is greatly improved.

Meanwhile, the non-metallic anti-explosion ball is light weighted and has a low volume occupying ratio.

In order to ensure that the non-metallic anti-explosion ball has a sufficient strength in the axial direction of the equatorial ring, so that it does not collapse in use, it is preferable that the non-metallic anti-explosion ball comprises a plurality of longitudinal sheets, and the plurality of longitudinal sheets intersect at an axis of the equatorial ring.

On the other hand, it is preferable that a supporting piece is fixed on the inner wall of the north-polar ring, so as to ensure that the north-polar ring of the non-metallic anti-explosion ball has a sufficient strength in the radial direction of the equatorial ring. Since the projection of the north-polar ring is positioned inside the projection of the south-polar ring in the axial direction of the equatorial ring, and the supporting piece is located inside the north-polar ring, the arrangement of the north-polar ring does not affect the one-step forming process of the non-metallic anti-explosion ball of the present invention, and thus the processing convenience and manufacturing efficiency of the non-metallic anti-explosion ball are ensured.

The specific structure of the supporting piece is not particularly limited. Preferably, in order to reduce the accumulation of oil at the intersection of the supporting piece and the north-polar ring, the supporting piece is in a "+" shape. The four ends of the supporting piece extend to the inner wall of the north-polar ring and are fixed.

The supporting piece may be arranged in multiple ways, and in order to facilitate the processing, a plane where the supporting piece is located is preferably perpendicular to the axis of the equatorial ring.

In order to further improve the strength of the non-metallic anti-explosion ball, the non-metallic anti-explosion ball further comprises a first reinforcement piece, the first reinforcement piece is disposed on a longitudinal sheet between the north-polar ring and the equatorial ring, and in an axial direction of the equatorial ring, a projection of the first reinforcement piece is located between the projection of the south-polar ring and the projection of the equatorial ring.

The projection of the first reinforcement piece along the axial direction of the equatorial ring is separated from the projection of the north-polar ring and the equatorial ring so as to ensure that the non-metallic anti-explosion ball can be smoothly molded in one step. Meanwhile, the first reinforcement piece can effectively support the longitudinal sheet.

The specific structure of the first reinforcement piece may adopt various forms and is not particularly limited in the present invention. Preferably, the first reinforcement piece is shaped as a closed loop. More preferably, the first reinforcement piece is parallel to the axis of the equatorial ring, in order to better ensure the reinforcing effect and facilitate the subsequent processing.

According to the present invention, to further enhance the strength of the non-metallic anti-explosion ball, it is preferable that the non-metallic anti-explosion ball further comprises a second reinforcement piece.

Similar to the first reinforcement piece, the second reinforcement piece disposed on a longitudinal sheet between the south-polar ring and the equatorial ring; and in an axial direction of the equatorial ring, a projection of the second reinforcement piece is located between the projection of the south-polar ring and the projection of the first reinforcement piece.

Similarly, the structure of the second reinforcement piece may adopt various existing forms, preferably, the second reinforcement piece is shaped as a closed loop, and the second reinforcement piece is parallel to the axis of the equatorial ring.

For the first reinforcement piece and the second reinforcement piece, in the axial direction of the equatorial ring, the projection of the second reinforcement piece is positioned inside the projection of the first reinforcement piece. It can be understood that the locations of the projections of the first and second reinforcement pieces in the axial direction of the equatorial ring are interchangeable, for example, the projection of the first reinforcement piece can be positioned inside the projection of the second reinforcement piece.

According to the present invention, in order to further enhance the stability and strength of the non-metallic anti-explosion ball, it is preferable that a connecting piece is arranged between the second reinforcement piece and an outer wall of the south-polar ring, and a plane where the connecting piece is located is perpendicular to the axis of the equatorial ring.

According to the present invention, the non-metallic anti-explosion ball further comprising a third reinforcement piece, the third reinforcement piece is disposed on the equatorial ring in an axial direction of the equatorial ring, one end of the third reinforcement piece is connected to the first reinforcement piece, and the other end of the third reinforcement piece is connected to the second reinforcement piece; in the axial direction of the equatorial ring, the projection of the third reinforcement piece extends from the second reinforcement piece to the equatorial ring; and a plane where the third reinforcement piece is located bisects an included angle formed by two longitudinal sheets adjacent to the third reinforcement piece.

The third reinforcement piece is very advantageous to further improve the strength of the non-metallic anti-explosion ball.

The material of the non-metallic anti-explosion ball comprises a substrate, carbon fibers, optional carbon black, optional carbon nanotubes, and an antioxidant; the substrate is at least one of the group consisting of nylon 6, nylon 66, polyphenylene sulfide, poly ethylene and polypropylene; the carbon fibers are chopped carbon fibers; the carbon black is nano conductive carbon black; the antioxidant is a combination of a multi-hindered phenolic antioxidant and a phosphite antioxidant; based on the content of the substrate, the content of the carbon fiber is 9-43 wt %, the content of the carbon black is 0-19.6 wt %, the content of the carbon nanotube is 0-19.6 wt %, and the content of the antioxidant is 0.5-0.8 wt %.

The carbon fibers are chopped carbon fibers; and preferably have a length of 3 mm-6 mm, a diameter of 6-8 μm, a carbon content ≥93%, and a specific resistance of $1.6 \times 10^{-3}$ Ω·cm; carbon fiber is one of the commonly used fibers for the modification of plastic conductivity. The addition of carbon fiber can also improve the mechanical properties of the substrate material. When the substrate material is subjected to an external impact, fiber particles can produce a lot of micro-deformations in the material, which can absorb the energy and well transmit the generated stress at the same time, such that the substrate generates a yield deformation and consumes a part of the impact energy, thereby playing a role in strengthening and toughening of the substrate material.

The carbon black is nano conductive carbon black, and preferably has a particle size of 40 to 50 nm, a DBP adsorption value of $204 \times 10^{-5}$ m$^3$/kg, a CTAB adsorption specific surface area of $363 \times 10^3$ m$^2$/kg, and a pH of 7.8; carbon black is one of the most commonly used conductive fillers, and the particle size of the nano-carbon black is smaller, that is, the probability of contact between carbon black particles is greater and space between particles is smaller, so the conductivity is better than that of conventional carbon black.

The antioxidant is a combination of a multi-hindered phenolic antioxidant and a phosphite antioxidant, the weight ratio of the multi-hindered phenolic antioxidant to the phosphite antioxidant is preferably 1.5-2:1, a combination of antioxidant pentaerythritol tetrakis (β-(3,5-di-tert-butyl-4-hydroxyphenyl)propionate) (antioxidant 1010) and antioxidant tris (2,4-di-tert-butylphenyl) phosphate (168) is preferred.

The nanotubes preferably have a particle size of 10 to 30 nm, a length of 10-50 μm, and a specific resistance of 10 to $10^{-3}$ Ω·cm; carbon nanotubes have a unique structure, a variety of conductive mechanisms, adjustable conductivity, can form a conductive mesh chain with fewer filler, and is a hot spot of polymer conductive modification.

The non-metallic anti-explosion ball of the present invention, compared with existing metal aluminum alloy anti-explosion materials, has the advantages of a longer service life, no need of replacement, a higher stability in flammable and explosive chemicals, no debris residue, a higher mechanical stability, no collapse phenomena or the like, being easy and convenient to disassemble, and so on.

The non-metallic anti-explosion ball of the present invention has the following characteristics: the structure of the sphere ensures a highly porous structure similar to that of a honeycomb, which can effectively prevent the surge phenomenon, and has good explosion-proof performance; a packing density per unit volume is in a range of 50-60 kg/m$^3$; about 90% of the volume of the non-metallic anti-explosion ball is filled, and the volume of the non-metallic anti-explosion ball accounts for about 5% of the volume of the container. The present invention performs the explosion-proof performance test under the standard condition, the pressure of the propane air mixed gas can be controlled to be not more than 0.14 MPa (the explosion pressure limit is 0.814 MPa).

Figure 2:
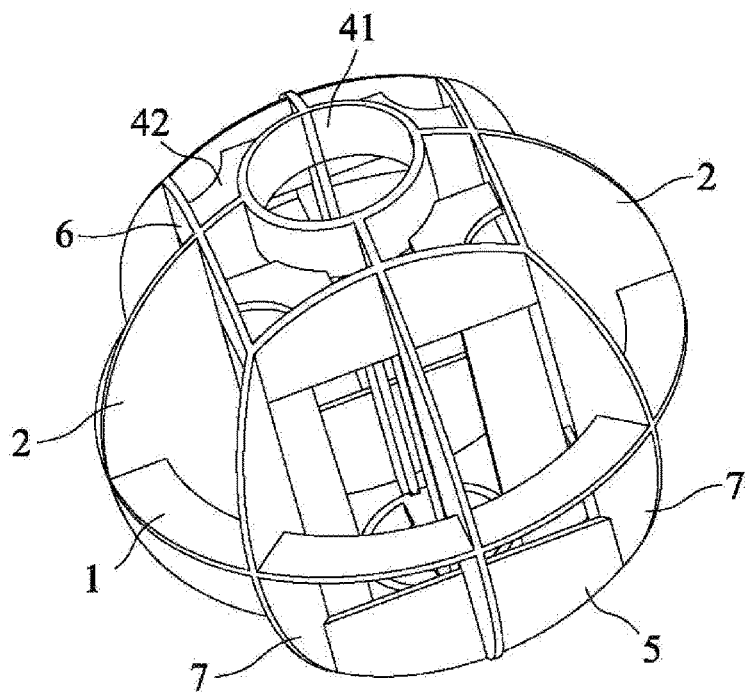
FIG. 2 is a bottom perspective view of a non-metallic anti-explosion ball provided by a preferred embodiment of the present invention.
Figure 3:
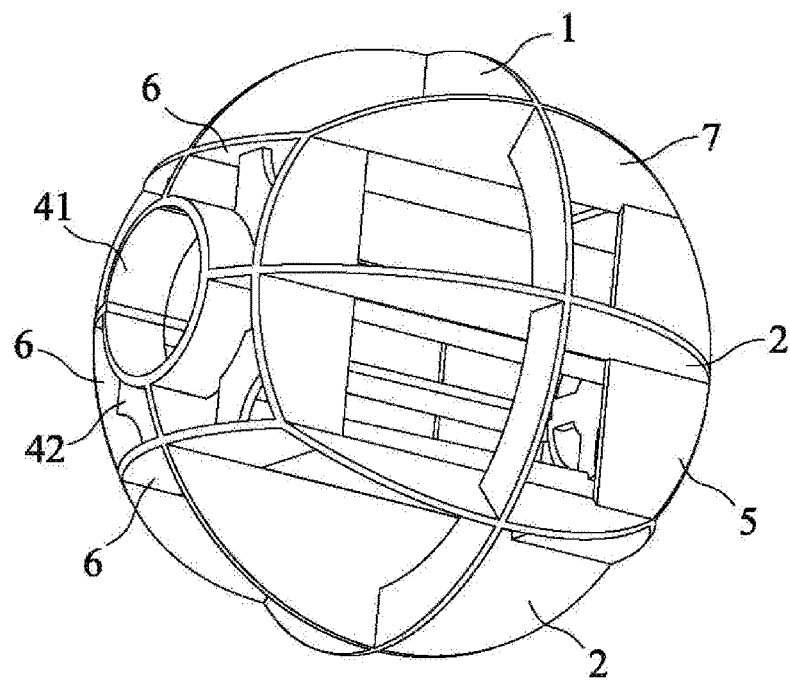
FIG. 3 is a transverse perspective view of a non-metallic anti-explosion ball provided by a preferred embodiment of the present invention.
Figure 4:
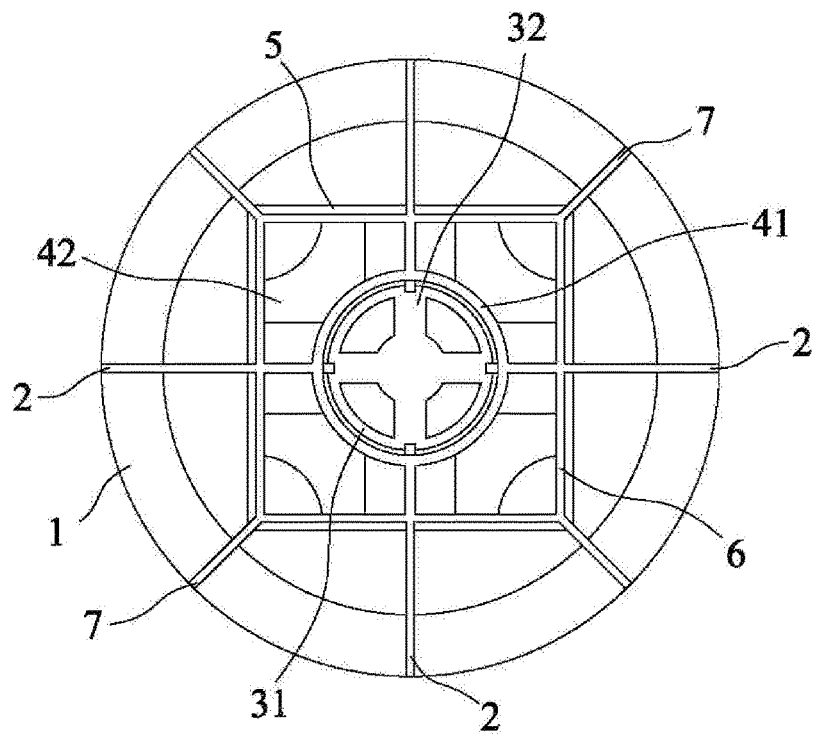
FIG. 4 is a front view of a non-metallic anti-explosion ball provided by a preferred embodiment of the present invention.
Figure 5:
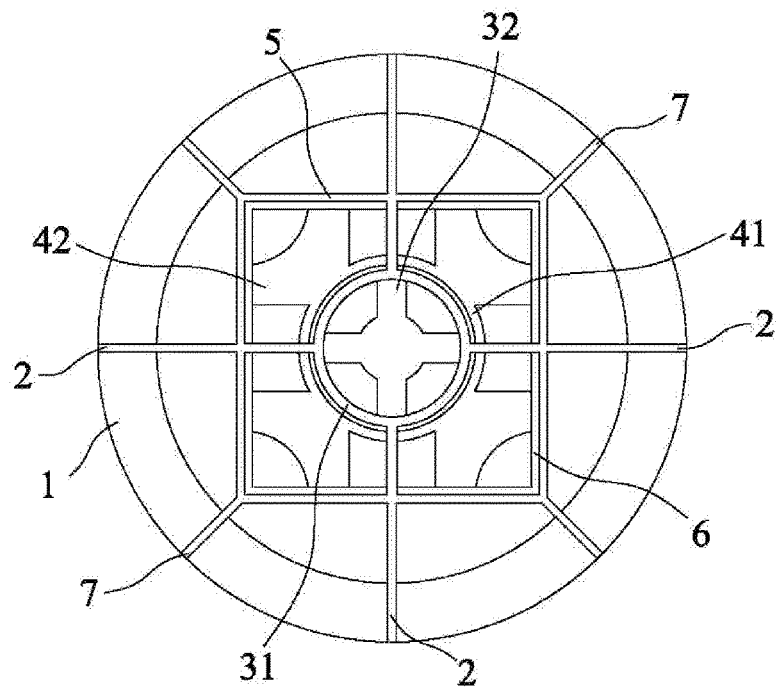
FIG. 5 is a rear view of a non-metallic anti-explosion ball provided by a preferred embodiment of the present invention.
Figure 6:
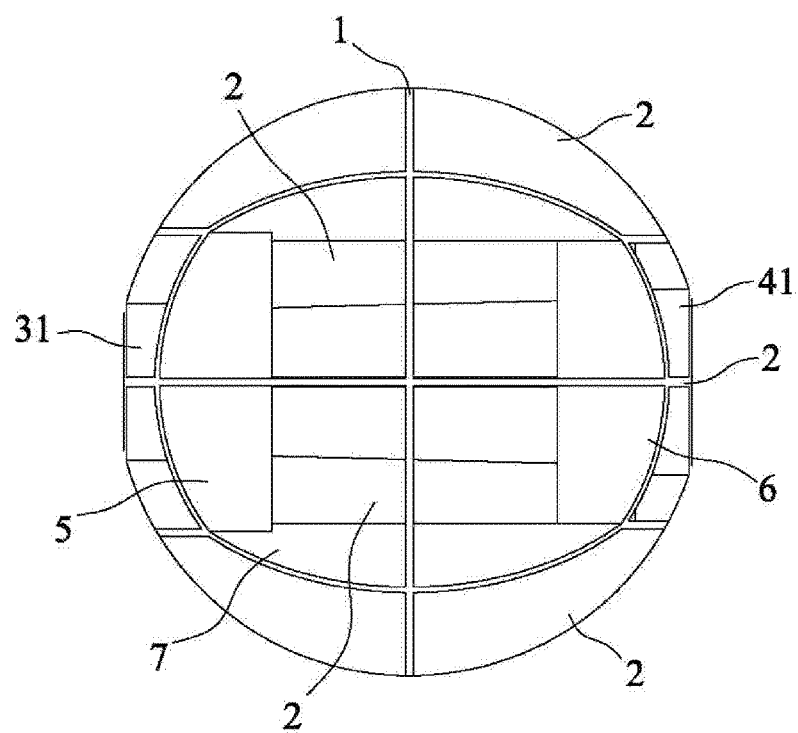
FIG. 6 is a left side view of a non-metallic anti-explosion ball provided by a preferred embodiment of the present invention.

The special structure and good conductive property of the present invention can prevent static electricity generated in a fuel tank or an oil tank due to flows and impacts of fuel, and avoid explosion accidents caused by the static electricity. The structure of the non-metallic anti-explosion ball provided in a preferred embodiment of the present invention will be further explained with reference to FIGS. 1 to 6.

With reference to FIGS. 1 to 6, the non-metallic anti-explosion ball comprise an equatorial ring 1, two longitudinal sheets 2, a north-pole ring 31, a supporting piece 32, a south-pole ring 41, a connecting piece 42, a first reinforcement piece 5, a second reinforcement piece 6 and four third reinforcing pieces 7.

Specifically, the equatorial ring 1 has a circular loop shape, and the inside thereof is a hollow structure. The equatorial ring 1 is set horizontally. The center of the equatorial ring 1 is the center of the non-metallic anti-explosion ball.

The two longitudinal sheets 2 intersect perpendicularly. The two perpendicularly intersecting longitudinal sheets 2 are arranged on the equatorial ring 1, and the intersecting lines of the two longitudinal sheets 2 are collinear with the axis of the equatorial ring 1.

A north-polar ring 31 is arranged at the top end of the longitudinal sheet 2. A south-polar ring 41 is arranged at the bottom end of the longitudinal sheet 2. The axes of the north-polar ring 31, the south-polar ring 41 and the equatorial ring 1 are coaxial.

The supporting piece 32 is generally shaped as "+". The four independent ends of the supporting piece 32 are connected to the inner wall of the north-polar ring 31. The supporting piece 32 is arranged along a horizontal plane.

The first reinforcement piece 5 is shaped as a rectangular loop. The first reinforcement piece 5 is arranged on the two longitudinal sheets 2, and the first reinforcement piece 5 is located between the north-polar ring 31 and the equatorial ring 1. The axis of the first reinforcement piece 5 is coaxial with the axis of the equatorial ring 1.

The second reinforcement piece 6 is shaped as a rectangular loop. The second reinforcement piece 6 is arranged on the two longitudinal sheets 2, and the second reinforcement piece 6 is located between the south-polar ring 41 and the equatorial ring 1. The axis of the second reinforcement piece 6 is coaxial with the axis of the equatorial ring 1.

The connecting piece 42 is arranged between the second reinforcement piece 6 and the south-polar ring 41.

The third reinforcement piece 7 is arranged on the equatorial ring 1 and the plane where the third reinforcement piece 7 is located passes through the axis of the equatorial ring 1. That is, the third reinforcement piece 7 is perpendicular to the equatorial ring 1. One end of each of the four third reinforcement pieces 7 is provided on an apex angle of the rectangular loop shaped first reinforcement piece 5, and the other end thereof is provided on an apex angle of the rectangular loop shaped second reinforcement piece 6, respectively. Moreover, a plane where the third reinforcement piece 7 is located bisects an included angle formed by the two longitudinal sheets 2 adjacent to the third reinforcement piece 7.

Meanwhile, along the equatorial ring 1 axis, the projection of the equatorial ring 1 has a circular loop shape.

The projection of the first reinforcement piece 5 is rectangular, and the projection of the first reinforcement piece 5 is located inside the projection of the equatorial ring 1.

Similarly, the projection of the second reinforcement piece 6 is also rectangular, and the projection of the second reinforcement piece 6 is located inside the projection of the first reinforcement piece 5.

The projection of the south-polar ring 41 is circular and located inside the projection of the second reinforcement piece 6. Since the connecting piece 42 is disposed between the second reinforcement piece 6 and the south-polar ring 41, the projection of the connecting piece 42 is located between the projection of the second reinforcement piece 6 and the projection of the south-polar ring 41.

The projection of the north-polar ring 31 is circular and located inside the projection of the south-polar ring 41. The connecting piece 32 is disposed inside the north-polar ring 31, and therefore the projection of the connecting piece 32 is located inside the projection of the north-polar ring 31.

Both the longitudinal sheets 2 and the four third reinforcement pieces 7 extend along the axial direction of the equatorial ring 1. In the axial direction of the equatorial ring 1, the two ends of the projection of each longitudinal sheet 2 are connected to the outmost edge of the projection of the equatorial ring 1 and the projection of the north-polar ring 31 respectively. The two ends of the projection of each third reinforcement piece 7 are connected to the outmost edge of the projection of the equatorial ring 1 and an apex angle of the rectangular projection of the second reinforcement piece 6 respectively.

The non-metal anti-explosion material provided by the present invention can be shaped by opening the mould at one time, the processing is convenient and the efficiency is high. At the same time, the non-metallic anti-explosion material is light weighted, the volume occupancy ratio thereof is less than 5%, and the strength thereof is high, with a compression strength of 136.2 kg when compressed into ⅓ thick. That is to say, the non-metallic anti-explosion material is very light in weight, convenient in processing, high in efficiency as well as high in strength.

The non-metallic anti-explosion balls shown in FIGS. 1 to 6 are made using plastic processing mould injection. The detailed raw material information is as follows.

Carbon fiber: polyacrylonitrile carbon fiber with a length of 6 mm, a diameter of 6.5 µm, a tensile strength being equal to or greater than 3.0 Gpa, a density of 1.76 g/cm$^3$, an elongation being equal to or greater than 1.5%, and a specific resistance of 1.6 Ω·cm, and from Liaoning Anke Activated Carbon Fiber Application Technology and Development Company.

Carbon black: nano-conductive carbon black with a particle diameter of 40 nm, a DBP adsorption value of 230×10$^{-5}$ m$^3$/kg, and a CTAB adsorption surface area of 370×10$^3$ m$^2$/kg, a pH of 8, and from Carbon Black Industrial Research and Design Institute, China Rubber Group.

Carbon nanotube: with a particle size of 40-50 nm, a length of 20-50 µm, and a resistivity of 10-10$^{-3}$ Ω·cm, and from Shenzhen Nano-port.

Nylon 66: in the Model of EPR27, with a tensile strength of 55 MPa, a bending strength of 71.8 MPa, and a notched impact strength of 9.1 kJ/m$^2$, and from China Pingmei Shenma Group.

Nylon 6: in the Model of CM1017, with a tensile strength of 80.4 MPa, a flexural strength of 108 MPa, a notched impact strength of 31 kJ/m$^2$, and a volume resistivity of 10$^{14}$-10$^{15}$ Ω·cm, and from Japan Toray.

Polyphenylene sulfide: with a tensile strength of 130 MPa, a bending strength of 207 MPa, and a notched impact strength of 7 kJ/m$^2$, and from Japan Baoli.

Polypropylene: with a tensile strength of 24 MPa, a bending strength of 50 MPa, and a notched impact strength of 2.5 kJ/m$^2$, and from Yanshan Petrochemical Company.

Example 1

The components are weighed according to the above-mentioned weight percentage, 0.2 parts by weight of antioxidant 168, 0.4 parts by weight of antioxidant 1010, and 100 parts by weight of nylon 6 matrix are mixed in a high-speed mixer for 2 minutes, and then placed together with 43 parts by weight of carbon fibers into a twin-screw extruder to produce particles, the twin-screw extruder is in a type of SHF-30 manufactured by Nanjing Jieente Electrical and Mechanical Services Limited. The rotation speed of the screws is 400 r/min, the temperature of each section of the extruder is controlled to be 235° C. in a first zone, 230° C. in a second zone, 240° C. in a third zone, 245° C. in a fourth zone, 250° C. in a fifth zone, and 260° C. in the machine head.

Example 2

The components are weighed according to the above-mentioned weight percentage, 0.1 parts by weight of antioxidant 168, 0.2 parts by weight of antioxidant 1010 and 100 parts by weight of nylon 6 matrix are mixed in a high-speed mixer for 2 minutes, and then placed together with 9 parts by weight of carbon fibers into a twin-screw extruder to produce particles, the twin-screw extruder is in a type of SHF-30 manufactured by Nanjing Jieente Electrical and Mechanical Services Limited. The rotation speed of the screws is 400 r/min, the temperature of each section of the extruder is controlled to be 235° C. in a first zone, 230° C. in a second zone, 240° C. in a third zone, 245° C. in a fourth zone, 250° C. in a fifth zone, and 260° C. in the machine head.

Example 3

The components are weighed according to the above-mentioned weight percentage, 0.2 parts by weight of antioxidant 168, 0.3 parts by weight of antioxidant 1010, 19.6 parts by weight of carbon black and 100 parts by weight of nylon 66 matrix are mixed in a high-speed mixer for 3 minutes, and then placed together with 13.4 parts by weight of carbon fibers into a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 450 r/min, the temperature of each section of the extruder is controlled to be 240° C. in a first zone, 245° C. in a second zone, 260° C. in a third zone, 265° C. in a fourth zone, 265° C. in a fifth zone, and 265° C. in the machine head.

Example 4

The components are weighed according to the above-mentioned weight percentage, 0.2 parts by weight of antioxidant 1010, 0.1 parts by weight of antioxidant 168, 19.6 parts by weight of carbon nanotubes and 100 parts by weight of nylon 66 matrix are mixed in a high-speed mixer for 3 minutes, and then placed together with 10 parts by weight of carbon fibers into a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 450 r/min, the temperature of each section of the extruder is controlled to be 240° C. in a first zone, 245° C. in a second zone, 260° C. in a third zone, 265° C. in a fourth zone, 265° C. in a fifth zone, and 265° C. in the machine head.

Example 5

The components are weighed according to the above-mentioned weight percentage, 0.2 parts by weight of antioxidant 168, 0.3 parts by weight of antioxidant 1010, 19.6 parts by weight of carbon black, 5 parts by weight of carbon nanotubes and 100 parts by weight of nylon 66 matrix are mixed in a high-speed mixer for 3 minutes, and then placed together with 9 parts by weight of carbon fibers into a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 450 r/min, the temperature of each section of the extruder is controlled to be 240° C. in a first zone, 245° C. in a second zone, 260° C. in a third zone, 265° C. in a fourth zone, 265° C. in a fifth zone, and 265° C. in the machine head.

Example 6

The components are weighed according to the above-mentioned weight percentage, 0.24 parts by weight of antioxidant 168, 0.36 parts by weight of antioxidant 1010, 12.3 parts by weight of carbon nanotubes and 100 parts by weight of polyphenylene sulfide matrix are mixed in a high-speed mixer for 3 minutes, and then placed together with 9.8 parts by weight of carbon fibers in a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 500 r/min, the temperature of each section of the extruder is controlled to be 285° C. in a first zone, 285° C. in a second zone, 290° C. in a third zone, 295° C. in a fourth zone, 300° C. in a fifth zone, and 305° C. in the machine head.

Example 7

The components are weighed according to the above-mentioned weight percentage, 0.15 parts by weight of antioxidant 168, 0.3 parts by weight of antioxidant 1010 and 100 parts by weight of PP matrix are mixed in a high-speed mixer for 2 minutes, and then placed together with 19.2 parts by weight of carbon fibers into a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 350 r/min, the temperature of each section of the extruder is controlled to be 170° C. in a first zone, 170° C. in a second zone, 175° C. in a third zone, 180° C. in a fourth zone, 185° C. in a fifth zone, and 185° C. in the machine head.

Example 8

The components are weighed according to the above-mentioned weight percentage, 0.22 parts by weight of antioxidant 168, 0.34 parts by weight of antioxidant 1010, 1.1 parts by weight of carbon nanotubes and 100 parts by weight of PP matrix are mixed in a high-speed mixer for 3 minutes, and then placed together with 11.3 parts by weight of carbon fibers into a twin-screw extruder to produce particles, the carbon fibers are fed from the sub-feed inlet of the extruder. The twin-screw extruder is in a type of SHF-30 manufactured by Nanjing Jieente Electrical and Mechanical Services Limited. The rotation speed of the screw is 450 r/min, the temperature of each section of the extruder is controlled to be 170° C. in a first zone, 170° C. in a second zone, 175° C. in a third zone, 180° C. in a fourth zone, 185° C. in a fifth zone, and 185° C. in the machine head.

The results of properties tests for the materials of Examples 1 to 8 are shown in Table 1:

TABLE 1

| | Main Properties | | | | |
|---|---|---|---|---|---|
| | Tensile Strength (Mpa) | Bending Strength (Mpa) | Notched Impact Strength (kJ/m$^2$) | Volume Resistivity (Ω · cm) | Surface Resistivity (Ω · cm) |
| | Test Standard | | | | |
| | ASTM D638 | ASTM D790 | ASTM D6110 | GB/T 1410-2006 | GB/T 1410-2006 |
| Example 1 | 235 | 260 | 8 | 10$^4$ | 10$^8$ |
| Example 2 | 210 | 240 | 5 | 10$^5$ | 10$^9$ |
| Example 3 | 240 | 265 | 7 | 10$^3$ | 10$^7$ |
| Example 4 | 234 | 255 | 10 | 10$^3$ | 10$^7$ |
| Example 5 | 213 | 207 | 12 | 10$^3$ | 10$^6$ |
| Example 6 | 204 | 243 | 34 | 10$^3$ | 10$^6$ |
| Example 7 | 60 | 112 | 12 | 10$^5$ | 10$^9$ |
| Example 8 | 57 | 109 | 13 | 10$^4$ | 10$^8$ |

Test results in Table 1 show that on the basis of improving the mechanical properties of the matrix, the composite materials prepared in Examples 1 to 8 obviously possess antistatic properties, their criteria meet the requirements of US Army Standard MIL-prf-87260b for the antistatic properties of barrier anti-explosion materials, and are in accordance with the requirements for the preparation of non-metallic anti-explosion balls.

The various masterbatches prepared in Examples 1 to 8 are processed by an injection molding machine into the structure of the non-metallic anti-explosion ball provided by the present invention, and the processed non-metallic anti-explosion balls are filled in an explosion-proof performance testing apparatus (AQ3001-2005) for a explosion-proof performance test.

First of all, when a test equipment is not filled with any non-metal anti-explosion ball, an increased deflagration pressure of propane gas (the explosion limit of propane air mixture is 2.1%-9.5%, with a preferred concentration of 4.5%) in the test equipment is tested to be 164.04 kPa; the explosion-proof effect is calculated using the following formula:

$$\lambda = \frac{\Delta p' - \Delta p}{\Delta p'} \times 100\%$$

In the formula:
Δp' represents the increased deflagration pressure when the anti-explosion material is not filled, kPa;
Δp represents the increased deflagration pressure when the anti-explosion material is filled, kPa;
λ represents the explosion-proof effect, %.

The explosion-proof performances of the non-metallic anti-explosion balls processed by various materials are shown in Table 2:

TABLE 2

| Test Content | Example 1 | Example 2 | Example 3 | Example 4 | Example 5 | Example 6 | Example 7 | Example 8 |
|---|---|---|---|---|---|---|---|---|
| Increased Deflagration Pressure when the anti-explosion ball is filled (kPa) | 13.07 | 15.02 | 13.95 | 13.87 | 14.11 | 12.46 | 13.26 | 14.36 |
| Explosion-proof Effect λ (%) | 90.85 | 90.13 | 91.07 | 91.25 | 91.16 | 92.01 | 91.44 | 90.27 |

The non-metallic explosion-proof performance test results of Table 2 shows that, all of Example 1-8 have excellent explosion-proof effect, their explosion-proof performances are all greater than 90%, their performance indexes are significantly higher than that of the existing metal alloy anti-explosion materials, and they have a higher overall performance, which indicates that the non-metallic anti-explosion ball of the present invention will be a good substitute for the existing anti-explosion materials.

The above contents are only preferred embodiments of the present invention, and are not intended to limit the present invention. Any modification, equivalent replacement or improvement made within the spirit and principle of the present invention should be included in the protection scope of the present invention.

What is claimed is:

1. A non-metallic anti-explosion ball, comprising an equatorial ring, at least one longitudinal sheet, a south-polar ring and a north-polar ring; wherein,
    the equatorial ring is arranged to be perpendicular to the longitudinal sheet; the south-polar ring and the north-polar ring are located on two sides of the equatorial ring respectively; the south-polar ring is located at one end of the longitudinal sheet, and the north-polar ring is located at the other end of the longitudinal sheet;
    the equatorial ring, the south-polar ring and the north-polar ring are coaxial;
    in an axial direction of the equatorial ring, a projection of the south-polar ring is located inside a projection of the equatorial ring; a projection of the north-polar ring is positioned inside the projection of the south-polar ring; a projection of the longitudinal sheet extends from the projection of the north-polar ring to the equatorial ring;
    the material of the non-metallic anti-explosion ball comprises a substrate, carbon fibers, optional carbon black, optional carbon nanotubes and an antioxidant; the substrate is at least one of the group consisting of nylon 6, nylon 66, polyphenylene sulfide, poly ethylene and polypropylene; the carbon fiber are chopped carbon fibers; the carbon black is nano conductive carbon black; the antioxidant is a combination of a multi-hindered phenolic antioxidant and a phosphite antioxidant;
    based on the content of the substrate, the content of the carbon fibers is 9-43 wt %, the content of the carbon black is 0-19.6 wt %, the content of the carbon nanotube is 0-19.6 wt %, and the content of the antioxidant is 0.5-0.8 wt %.

2. The non-metallic anti-explosion ball according to claim 1, wherein the weight ratio of the multi-hindered phenolic antioxidant to the phosphite antioxidant is 1.5-2:1.

3. The non-metallic anti-explosion ball according to claim 1, wherein the non-metallic anti-explosion ball comprises a plurality of longitudinal sheets, and the plurality of longitudinal sheets intersect at an axis of the equatorial ring.

4. The non-metallic anti-explosion ball according to claim 3, wherein a supporting piece is fixed on an inner wall of the north-polar ring.

5. The non-metallic anti-explosion ball according to claim 4, wherein the supporting piece is in a "+" shape, and a plane where the supporting piece is located is perpendicular to the axis of the equatorial ring.

6. The non-metallic anti-explosion ball according to claim 3, wherein the non-metallic anti-explosion ball further comprising a first reinforcement piece;
    the first reinforcement piece is disposed on a longitudinal sheet between the north-polar ring and the equatorial ring; and in an axial direction of the equatorial ring, a projection of the first reinforcement piece is located between the projection of the south-polar ring and the projection of the equatorial ring.

7. The non-metallic anti-explosion ball according to claim 6, wherein the first reinforcement piece is shaped as a closed loop; and the first reinforcement piece is parallel to the axis of the equatorial ring.

8. The non-metallic anti-explosion ball according to claim 7, wherein the non-metallic anti-explosion ball further comprising a second reinforcement piece;
    the second reinforcement piece is disposed on a longitudinal sheet between the south-polar ring and the equatorial ring; and in an axial direction of the equatorial ring, a projection of the second reinforcement piece is located between the projection of the south-polar ring and the projection of the first reinforcement piece.

9. The non-metallic anti-explosion ball according to claim 8, wherein the second reinforcement piece is shaped as a closed loop, and the second reinforcement piece is parallel to the axis of the equatorial ring;
    a connecting piece is arranged between the second reinforcement piece and an outer wall of the south-polar ring, and a plane where the connecting piece is located is perpendicular to the axis of the equatorial ring.

10. The non-metallic anti-explosion ball according to claim 8, wherein the non-metallic anti-explosion ball further comprising a third reinforcement piece;
    the third reinforcement piece is disposed on the equatorial ring along an axial direction of the equatorial ring, one end of the third reinforcement piece is connected to the first reinforcement piece, and the other end of the third reinforcement piece is connected to the second reinforcement piece;
    in the axial direction of the equatorial ring, a projection of the third reinforcement piece extends from the second reinforcement piece to the equatorial ring;
    a plane where the third reinforcement piece is located bisects an included angle formed by two longitudinal sheets adjacent to the third reinforcement piece.

* * * * *